2,799,663

RESINOUS POLYHYDRIC ALCOHOLS MODIFIED WITH POLYISOCYANATES

Horace Arthur Hampton and Reginald Hurd, Blackley, Manchester, England, assignors to Imperial Chemical Industries Limited, a corporation of Great Britain No Drawing. Application August 3, 1953, Serial No. 372,190

Claims priority, application Great Britain August 20, 1952

1 Claim. (Cl. 260—45.4)

This invention relates to improvements in or relating to resinous polyhydric alcohols and more particularly to the modification thereof with polyisocyanates and with alkyd resins.

The resinous polyhydric alcohols with which the invention is concerned are obtainable by the reaction in the presence of alkali of polyhydric phenols with polyhalohydrins or epihalohydrins and include for example the reaction products of resorcinol, bis-phenol (i. e. bis-(4-hydroxyphenyl) 2:2-propane), p:p'-dihydroxydiphenyl, 1:1-bis-(4-hydroxyphenyl)-cyclohexane or 2-phenyl-1:3-dihydroxynaphthalene with epichlorhydrin or glycerol dichlorhydrin. The preferred polyhydric phenol is bisphenol.

It has already been proposed, for example in U. S. specification No. 2,060,715, to modify these resinous polyhydric alcohols, for use as coating compositions, with other resins such as cellulose derivatives, polyhydric alcohol-polybasic acid, amine-aldehyde, phenol-aldehyde or vinyl resins. The coating compositions so obtained in some cases, give flexible films when stoved at high temperatures of about 180° C. or higher.

We have now found that films of excellent flexibility can be obtained with the use of lower stoving temperatures when the resinous polyhydric alcohol is modified with an organic polyisocyanate.

Thus according to the present invention we provide a resinous composition, useful for the preparation of coating compositions, comprising a resinous polyhydric alcohol and an organic polyisocyanate.

Any organic polyisocyanate may be used in the resinous compositions of this invention. Thus there may be used, for example, ethylene diisocyanate, hexamethylene diisocyanate, dicyclohexylmethane diisocyanate, m-phenylene diisocyanate, toluylene-2:4-diisocyanate, toluene-2:4:6-triisocyanate or triphenylmethane-4:4':4''-triisocyanate. In place of polyisocyanates themselves there may also be used reaction products of polyisocyanates, some of which may function by liberating the polyisocyanates under the conditions of the coating process. These products include for example polyisocyanate adducts such as the bisulphite adducts and reaction products of polyisocyanates and compounds containing reactive methylene groups such as acetoacetic esters, and phenyl urethanes.

Especially suitable proportions of polyisocyanate are from 5% to 40% of the weight of the resinous polyhydric alcohol. When polyisocyanate reaction products are used, larger amounts are required; suitable proportions are then from 20% to 100%. Even larger amounts may be used in the case of reaction products formed from small proportions of polyisocyanates.

We have also found that the resinous compositions of this invention can be further improved by the incorporation of alkyd resins. Thereby there can be obtained, using stoving temperatures as low as 100° C., or in some cases at room temperature, films with very good adhesion, flexibility, chemical resistance and hardness.

Moreover, there is thereby avoided the considerable drop in flexibility that is found to result when the prior art resinous polyhydric alcohol coating compositions are pigmented. When our blend of resinous polyhydric alcohol, alkyd resin and polyisocyanate is employed a high standard of flexibility is retained in the pigmented finish, and also a superior gloss.

Thus according to a further feature of the invention we provide a resinous composition, useful for the preparation of coating compositions, comprising a resinous polyhydric alcohol, an alkyd resin and an organic polyisocyanate.

Any alkyd resin, preferably containing free hydroxyl groups, may be used in the resinous compositions of this invention. Thus there may be used the condensation products of adipic acid, sebacic acid, phthalic acid (or anhydride), with glycerol, ethylene glycol, sorbitol, pentaerythritol, diethylene glycol, butylene glycol or trimethylopropane or mixtures of such products. Better results are obtained when the hydroxyl value is greater than 1%. Excellent results are obtained with the use of oil-free alkyd resins of low acid value and hydroxyl value from 3% to 12%.

Suitable proportions of alkyd resin are from 25% to 80% of the weight of the resinous polyhydric alcohol.

The proportions of polyisocyanate required for the mixture of alkyd resin and resinous polyhydric alcohol are somewhat greater than the proportions required for the alcohol alone. Thus from 20% to 45% by weight of the combined alkyd resin and resinous alcohol may be used of polyisocyanate or from 50% to 160% of polyisocyanate reaction product. In the case of the reaction products of high molecular weight even higher proportions may be used.

Coating compositions can be prepared from the resinous compositions of this invention by addition of the usual ingredients. Thus there may be incorporated solvents such as cyclohexanone, methyl isobutyl ketone, methyl ethyl ketone or ethyl acetate and diluents such as benzene or xylene. Pigments such as titanium dioxide, lithopone, iron oxides, carbon black can be used. Certain pigments, especially basic ones, such as zinc oxide cause rapid gelation of the resin/polyisocyanate solution and should therefore be avoided. Extenders such as china clay, barytes can be used.

The addition of from 0.2% to 4% of a polymeric aliphatic ester of an alpha beta unsaturated carboxylic acid on the amount of resinous polyhydric alcohol and alkyd resin gives films with much less tendency to "crater," "ciss" or "crawl." The preferred polymeric aliphatic ester is polybutyl fumarate.

The coating compositions so obtained are particularly useful as wire enamels and as chemical resistant lacquers.

The invention is illustrated but not limited by the following examples in which parts and percentages are by weight.

EXAMPLE 1

To 10 parts of a resinous polyhydric alcohol dissolved in 7 parts of cyclohexanone and 7 parts of methyl isobutyl ketone was added 2 parts of meta-toluylene diisocyanate. This solution was applied to steel and aluminium by spraying or flowing. The addition of 5% of a 50% solution in xylene/butanol of a urea-formaldehyde resin on the amount of the polyhydric alcohol was found to improve the flow properties of the solution giving films with less tendency to "crater" or "ciss." After application to steel or aluminium the film was stoved for 1 hour at 150° C. At the end of this period the film obtained with or without the presence of the urea-formaldehyde resin had good adhesion and flexibility.

The flexibility of the film was superior to that obtained by curing the polyhydric alcohol with a urea-formaldehyde resin at 150° C.

The superior flexibility obtained with the polyisocyanate curing at 150° C. is demonstrated by the following readings obtained on an Erichsen paint and lacquer testing machine using standard aluminum panels coated with the solutions and stoved at 150° C. for ½ hour.

|  | Reading |
|---|---|
| Polyhydric alcohol/meta toluylene di-isocyanate | 8.3. |
| Polyhydric alcohol/U/F resin in the proportions 8 to 1 and 7 to 3 | 2.6 and 3.0 respectively. |

(A higher Erichsen reading indicates greater flexibility.)

The resinous polyhydric alcohol used in this example was prepared as follows:

228 parts of bis-(4-hydroxyphenyl)-2:2-propane are dissolved in a solution of 50 parts of caustic soda in 450 parts of water by warming to about 45° C. in a vessel fitted with a stirrer, thermometer and reflux condenser. 111 parts of epichlorhydrin are added during 30 minutes, the reaction being slightly exothermic. A solution of 12 parts of caustic soda in 110 parts of water is then added and the mixture is heated to 95–100° C. and so maintained for one hour.

The aqueous layer is decanted and the molten resin is washed repeatedly with boiling water, with occasional addition of acetic acid until the washings are free from chloride ion and neutral, when the resin is dried by heating in an oven to a temperature of 150° C.

The resin is a brittle, clear and pale yellow solid, M. P. 88.5° C. and has an epoxide equivalent of 1020. (The epoxide equivalent is the weight in grams of resin containing 1 epoxy group, which is determined by the pyridine hydrochloric acid method.)

EXAMPLE 2

To 10 parts of the resinous polyhydric alcohol as used in Example 1 dissolved in 7 parts of cyclohexanone and 7 parts of methyl isobutyl ketone was added 4 parts of a condensation product of meta-toluylene di-isocyanate, glycerol, diethylene glycol and phenol dissolved in 3 parts of cyclohexanone and 3 parts of methyl isobutyl ketone.

This solution was applied to steel and aluminium by spraying or flowing and was stoved for ½ hour at 150° C.

The film obtained had superior flexibility to that of a film from the polyhydric alcohol cured with a urea-formaldehyde resin for ½ hour at 150° C.

The superior flexibility obtained is demonstrated by the following readings obtained on an Erichsen paint and lacquer testing machine.

|  | Reading |
|---|---|
| Polyhydric alcohol/polyisocyanate product | 9.3. |
| Polyhydric alcohol/U/F resin in the proportions 8 to 2 and 7 to 3 | 2.6 and 3.0 respectively. |

The polyisocyanate reaction product used in this example was prepared as follows:

200 parts of m-toluylene diisocyanate, 23 parts of glycerol and 21.2 parts of diethylene glycol are heated together in ethyl acetate at 75°–80° C. for one hour to give a material containing 75% solids.

1030 parts of this material and 346 parts of phenol are heated slowly to 180° C., allowing the ethyl acetate to distil.

EXAMPLE 3

To 5 parts of the resinous polyhydric alcohol as used in Example 1 dissolved in 2.5 parts of cyclohexanone and 2.5 parts of methyl isobutyl ketone was added 4 parts of a mixed polyester from adipic acid and ethylene glycol and glycerol, 2 parts of m-toluylene di-isocyanate and 5 parts of methyl ethyl ketone. This solution was applied to steel and aluminium by spraying or flowing. The addition of 0.4% polybutyl fumarate on the amount of polyhydric alcohol was found to improve the flow properties of the solution giving films with less tendency to "crater" or "ciss." After application to steel or aluminium the film was stoved for 1 hour at 100° C. At the end of this period the film obtained with or without the presence of the urea formaldehyde resin had excellent adhesion, flexibility, chemical resistance and abrasion resistance. The flexibility of this film was considerably superior to that obtained by curing the polyhydric alcohol with a urea-formaldehyde resin at 100° C. and the flexibility obtained with the blend was in fact equal to that obtained using the urea-formaldehyde resin as curing agent at 200° C.

The flexibility and adhesion referred to above were tested by the following methods:

(a) By a heavy impact tester.
(b) By a mandrel test.
(c) By the Erichsen paint and lacquer testing machine.
(d) By a "window pane" test which consists of cutting lines through the film to the base metal at intervals of one tenth of an inch and in two directions so as to give a window pane effect. This test causes lacquers with poor adhesion to separate from the metal.

The film obtained by curing the blend at 100° C. had excellent chemical resistance having only slightly inferior resistance to that obtained with the polyhydric alcohol cured with a U/F resin at 180° C.

Stoving at temperatures of 180° C. and above increases the danger of "pin-holing" in lacquers. By means of the above blend, flexibility and chemical resistance can be obtained at 100° C. where the danger of pinholing is not so great.

The mixed polyester employed in this example was obtained as follows:

430 parts of glycerol, 917 parts of ethylene glycol and 2000 parts of adipic acid are charged into an aluminum or stainless steel kettle provided with a carbon dioxide inlet tube, a thermometer pocket, an anchor type agitator and a distillation condenser. The mixture is heated during 1 to 2 hours up to 200° C., stirring being started as soon as is possible; a clear solution is formed when the temperature reaches about 102° C. Carbon dioxide is passed continuously in a slow stream and serves to prevent deterioration of the colour of the product. The heating is continued at 200° C. and after 4½ to 8½ hours, when the acid value of the polyester has fallen to just below 6 milligrams of KOH per gram, the product is discharged at about 150° C. On cooling, there is obtained a pale yellow, viscous liquid, having a viscosity of the order of 200 poises at 20° C. and a hydroxyl content of 6%.

EXAMPLE 4

Example 3 was repeated using 2 parts of diphenylmethane diisocyanate instead of 2 parts of m-toluylene diisocyanate and using a mixed polyester from adipic acid, 1:3-butylene glycol and trimethylolpropane. A film having similar flexibility, adhesion and chemical resistance to that of Example 1 was obtained.

The mixed polyester used in this example was obtained as follows:

3 molecular proportions of adipic acid, 3 molecular proportions of 1:3-butylene glycol and 1 molecular proportion of trimethylolpropane are heated together, with stirring, in a flask fitted for distillation, a slow stream of carbon dioxide being passed through the apparatus. The mixture is heated to 200° C. in the course of 1 to 1½ hours, and held at that temperature until the acid value falls to less than 6 mg. KOH/gm.

EXAMPLE 5

Example 3 was repeated using a resinous polyhydric alcohol having hydroxyl end groups. After baking for 1 hour at 100° C. the film obtained had excellent flexibility, chemical resistance and abrasion resistance but the flexibility and the resistance to hot 20% sodium hydroxide solution were slightly less than for the polyhydric alcohol of Example 1.

The polyhydric alcohol used in this example was prepared as follows:

The recipe for the polyhydric alcohol of Example 1 is repeated but using 74 parts of epichlorhydrin and 32.2 parts of ethylene chlorhydrin. The so-obtained resin has a softening point of 90.5° C. and an epoxide equivalent of 19,500.

EXAMPLE 6

Example 3 was repeated using 10 parts of polyhydric alcohol, 4 parts of polyester and 5 parts of m-toluylene diisocyanate. After baking at 100° C. a film resulted, having very similar properties to that obtained in Example 4. The lacquer gave after curing for ½ hour at 100° C. an Erichsen reading of greater than 10.0.

EXAMPLE 7

To 10 parts of the polyhydric alcohol of Example 1 dissolved in 13 parts of cyclohexanone and 7 parts of methyl isobutyl ketone was added 8 parts of the polyester of Example 3 and 12 parts of m-toluylene diisocyanate/condensation product of Example 2.

Films obtained by curing this solution at 150° for ¾ hour had excellent flexibility, adhesion, and chemical resistance. The flexibility obtained by curing the polyhydric alcohol with a U/F resin at 150° C. for ¾ hour was less than the flexibility obtained with the above blend at 150° C. for ¾ hour. When the blend described above was cured at temperatures between 300° C. and 400° C. films having properties suitable for wire enamels were obtained.

EXAMPLE 8

The following solutions were prepared:

Solution A

| | Parts |
|---|---|
| Resinous polyhydric alcohol | 50.0 |
| Cresylic acid | 32.4 |
| Xylol | 17.6 |

Solution B

| | Parts |
|---|---|
| Mixed polyester of Example 3 | 50.0 |
| Cresylic acid | 50.0 |

Solution C

| | Parts |
|---|---|
| m-Toluylene diisocyanate condensation product of Example 2 | 33.3 |
| Cresylic acid | 66.6 |

An enamel of the following composition was then made:

| | Parts |
|---|---|
| Solution A | 50 |
| Solution B | 40 |
| Solution C | 120 |
| Cresylic acid | 40 |

Solids content by determination=29%.

0.024″ copper wire was coated with this enamel using a running speed of 8.18 feet/second through a 3 ft. oven at a temperature of 410° C.

The coating obtained on the wire had excellent flexibility and when tested for hardness and abrasion resistance by the oscillating needle scrape test laid down in BSS. 1844 (Appendix B) passed the specification, giving a superior result to that obtained from a wire enamel using the polyhydric alcohol cured with urea formaldehyde resin.

EXAMPLE 9

Example 3 was repeated using 4 parts of a mixed polyester as used in Example 4 except that twice the quantity of trimethylolpropane was used. A film having similar flexibility, adhesion and chemical resistance to that given by the blend in Example 3 was obtained.

EXAMPLE 10

To 5 parts of the resinous polyhydric alcohol as used in Example 1 dissolved in 2.5 parts of cyclohexanone and 2 parts of methyl isobutyl ketone was added 4 parts of the mixed polyester from adipic acid, ethylene glycol and glycerol described in Example 3, 3 parts of p:p′-diphenylmethane diisocyanate and 5 parts of methyl ethyl ketone. This solution was applied to steel and aluminum by spraying or flowing. After drying at room temperature for 2 days the film was found to give a flexibility reading on the Erichson paint and lacquer testing machine of 11.0. The lacquer was also found to have good resistance to two weeks' immersion in 20% caustic soda solution, being superior in this respect to the mixed polyester when cured with polyisocyanate without the presence of the resinious polyhydric alcohol.

What we claim is:

A resinous composition capable of forming films of improved flexibility on stoving at a temperature of up to 150° C. comprising (1) a resinous polyhydric alcohol obtained by the reaction of a polyhydric phenol with a member of the group consisting of polyhalohydrins and epihalohydrins, (2) an organic polyisocyanate present in an amount from 5 to 40% of the weight of said resinous polyhydric alcohol, (3) an oil-free alkyd resin of low acid value and hydroxyl value from 3 to 12% present in an amount from 25 to 80% of the weight of said resinous polyhydric alcohol, and (4) polybutyl fumarate present in an amount from 0.2% to 4% of the combined weight of said resinous polyhydric alcohol and said alkyd resin.

References Cited in the file of this patent

UNITED STATES PATENTS

| 2,277,083 | Dorough | Mar. 24, 1942 |
| 2,282,827 | Rothrock | May 12, 1942 |
| 2,430,479 | Pratt et al. | Nov. 11, 1947 |
| 2,558,949 | Greenlee | July 3, 1951 |
| 2,594,979 | Nelson | Apr. 29, 1952 |

OTHER REFERENCES

Shell, "Epon Resins," Paint, Oil, and Chemical Review, November 9, 1950, pages 15–18, 48 and 49.